Oct. 11, 1938.   H. WOLLNER   2,132,816
UNIVERSAL JOINT
Filed July 24, 1936
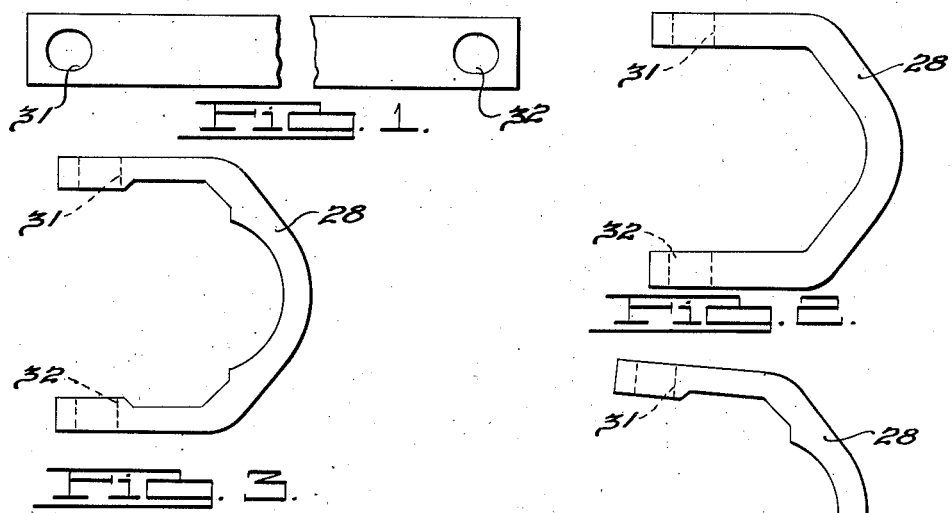
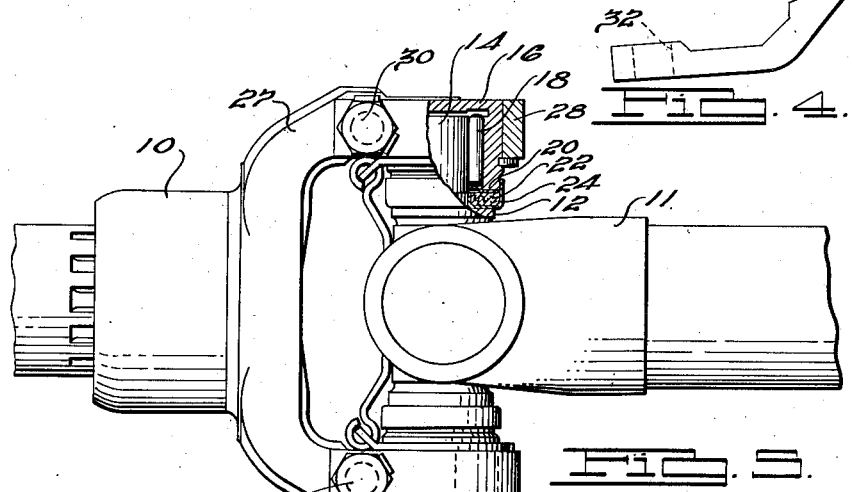
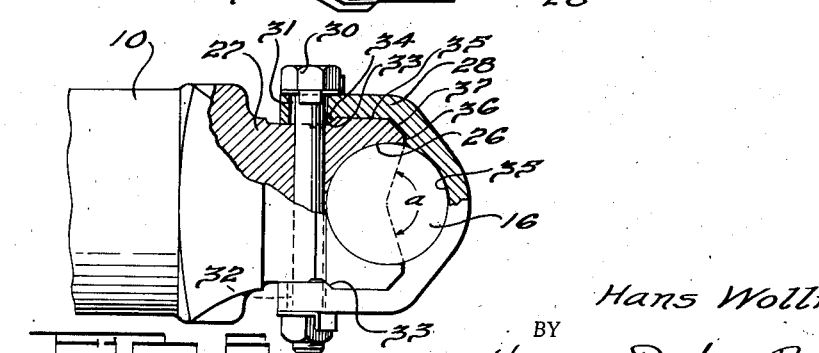
INVENTOR.
Hans Wollner.
BY
Harness, Dickey, Pierce & Hann.
ATTORNEYS.

Patented Oct. 11, 1938

2,132,816

UNITED STATES PATENT OFFICE 2,132,816

UNIVERSAL JOINT

Hans Wollner, Detroit, Mich., assignor to Universal Products Co. Inc., a corporation of Delaware Application July 24, 1936, Serial No. 92,337

1 Claim. (Cl. 64—17)

The invention relates to a universal joint for coupling together sections of shafting and particularly to the type of universal joint disclosed in applicant's copending application, Serial No. 21,515, filed May 15, 1935.

In applicant's aforementioned application there is disclosed a universal joint of the cross trunnion type in which one pair of opposed trunnions is adapted to be assembled with its supporting yoke by movement axially of the universal joint, the arms of the yoke being bifurcated and adapted to surround and engage approximately one-half of the perimeter of the respective bearing cups on the trunnions, and the bearing cups being held in position by means of U-shaped straps which surround the cups and ends of the yokes and engage the cups over a limited area of their peripheries. When the joint of the above application is assembled considerable pressure is exerted upon the cups by means of the U-shaped retaining straps and it has been found that the application of the relatively high pressure upon a limited area of the cups tends to deform the same and in some instances may actually deform the same sufficiently to impair the operation of the bearings. This difficulty is particularly subject to occurrence when the bearing cups are stamped of sheet metal, which is the preferred method of making the cups, inasmuch as the sheet metal cups offer comparatively little resistance to lateral compression, unless it is distributed entirely around the periphery.

Accordingly, it is the object of the present invention to provide a U-shaped strap of the type shown in the prior application which is adapted to engage substantially all portions of the periphery of the cup not engaged by the yoke arms, in order that the pressure may be distributed over the entire periphery of the cup and thereby hold the same in proper shape.

A further object of the invention is to provide an improved method of making a U-shaped clamp of the type described by means of which the aforesaid clamp may be inexpensively yet accurately manufactured in large quantities.

Other objects and advantages of the invention will appear from the following description and the appended claim.

In the drawing:

Figure 1 is a view of the metal bar utilized in the manufacture of the retaining straps.

Figure 2 is a view showing the strap after it is bent into U form, and before it is released from the dies.

Figure 3 shows the strap after its inner surfaces have been machined, but before it is released from the machine fixture.

Figure 4 shows the completed strap ready for assembly upon the joint.

Figure 5 is a side elevation of the assembled universal joint.

Figure 6 is a plan view with parts in section showing the manner in which the strap secures the cup in position.

The present invention is particularly adapted for use in connection with universal joints of the type shown in Figs. 5 and 6 of the drawing. This joint comprises a driving yoke 10 and a driven yoke 11 connected by a cross trunnion member 12 having four radially extending trunnions 14 surrounded by bearing cups 16. In the preferred form of the joint, roller bearings 18 are utilized between the bearing surfaces on the trunnions and the cups. The rollers 18 are held against longitudinal displacement from the cups by means of a retaining ring 20 press fitted into the open ends of the cups; and the outwardly extending flange of the retaining ring 20 is held in pressure engagement with an annular packing 22 positioned within a channel member 24 mounted on the cross trunnion member 12 adjacent the base of the trunnion 14, all as more fully disclosed in applicant's aforementioned copending application.

The upper and lower bearing cups 16, as viewed in Figure 5, seat within recesses 26 formed in the ends of the arms 27 of yoke 10, which recesses open axially of the joint and surround slightly more than one-half of the periphery of the associated cups. The recesses are so formed that the cups may be placed within them by movement transversely of the axis of the cups. It will be understood that the cups on the horizontally extending trunnions, as viewed in Figure 5, are secured to the arms of yoke member 11 in any desired manner.

In the universal joint disclosed in applicant's aforementioned copending application a simple strap member is utilized for holding the cup member 16 in position in the recess 26, which strap member contacts the cup over only a portion of its exposed periphery. While that arrangement of parts has been commercially successful on a large scale, it has been found that the concentration of force exerted by the strap member upon the cup, which force ranges in the neighborhood of 200 pounds pressure and is effective upon a relatively small area of the cup, has a tendency to deform the same and may in some cases have a deleterious effect upon the bearing surfaces on the interior of the cup. This danger is rendered more likely by reason of the fact that the cups 16 in commercial universal joints are formed of pressed metal and offer comparatively little resistance to lateral compression when it is unevenly distributed.

In accordance with the present invention these difficulties have been overcome by providing a clamp member 28, the interior surfaces of which are shaped to tightly engage the entire exposed periphery of the cups 16 throughout the angle a, as indicated on Figure 6, and the remaining interior surfaces of the clamp 28 are likewise shaped to correspond closely to the portions of the extremity of arm 27 which are embraced by the arms of the clamp member.

Clamp 28, in its completed condition, is normally sprung apart slightly as shown to an exaggerated extent in Figure 4, in which position it is inserted over the extremity of arm 27, axially of the trunnion 14 whereupon a bolt 30 is inserted through suitable openings 31 and 32 in the ends of the clamp member and the clamp is tightened upon the arm 27. During this tightening action, cooperating cam surfaces 33 and 34 on the clamp 28 and arm 27 hold the clamp member tightly against the cup and secure the cup firmly in position within the recess in the arm 27 under relatively high pressure. The parts are so designed that when the arms of the clamp are pulled by bolt 30 into engagement with the sides 35 of the yoke arms 27, cam surfaces 33 and 34 have moved relatively just enough to create the desired pressure on cups 16. Accordingly, in making the clamp of the present invention it is of great importance that the distances between the cam surfaces 33 on the clamp and the surface of the clamp which engages the cup be very accurately determined. Likewise it is essential that the interior surface of the clamp closely approach, but not contact, the extremity of the arm at the points indicated 36 and 37 on the drawing, in Figure 6, when the clamp is fully tightened.

It is an important characteristic of the clamp of the present invention that the exterior contour and the general contour thereof are such that the tension forces exerted by the cam surfaces 33 and 34 upon the extremities of the clamp arms effect substantially pure tension stresses throughout the entire length of the clamp. This enables the use of a relatively light weight pressed metal clamp without at the same time incurring the disadvantages of contacting the cup over a relatively limited area.

The present invention includes a novel and exceedingly simple and effective method of accurately forming a clamp of the type shown and described herein. In accordance with this method, the clamp is formed from a straight bar of metal such as shown in Figure 1, which may be cut in suitable lengths from a longer strip. If desired, during the cutting operation holes 31 and 32 may be punched, or if preferred these holes may be punched at any time during the later steps in the manufacture of the clamp. The blank shown in Figure 1 is then placed in a suitable die and stamped into the form shown in Figure 2. The dies are so formed as to stamp the legs of the clamp member 28 into parallel planes, which position they assume when the clamp is tightened upon the arm 27. Upon the completion of this stamping operation and removal of the U-shaped bar shown in Figure 2 from the stamping die, the inherent resiliency of the metal tends to spread the legs of the clamp apart to a slight extent, and this tendency is utilized to advantage as will be pointed out hereafter.

The strap member 28 is then placed in a suitable fixture which will force the legs back and hold them in true parallelism; and while so held, the interior surfaces are machined by a broaching operation. In performing this broaching operation preferably a broaching fixture of the conventional type is provided, which fixture supports an aligned series of broaching tools, the composite exterior contour of which corresponds to the desired interior contour of the clamp when it is tightened in position upon the arm 27 of the driving yoke 10. Accordingly, when this broaching fixture is passed between the legs of the clamp member 28, it accurately forms all of the interior surfaces of the clamp at the same time and in a single passage. It will be understood that during this machining operation the legs of the clamp are held in true parallelism and hence that the surfaces which are formed will correspond at the time of formation with the exact shape of the clamp when it is tightened in position on the yoke. Upon completion of the broaching operation the clamp is released from the work fixture whereupon the legs thereof under the influence of the inherent resiliency of the clamp itself spread apart in the manner shown in Figure 4, in which position they are adapted for assembly upon the yoke arm 27. Assembly of the clamp 28 is greatly facilitated if the arms thereof are spread slightly prior to assembly and hence this inherent spreading action is of considerable importance. In some cases it may be found that the inherent resilience causes insufficient spreading action of the arms, in which case it may be advisable to subject the clamp upon completion of the broaching to a further operation in which the legs are positively spread to a slightly greater extent. This, however, is not ordinarily necessary.

It will be observed that in accordance with the present invention there is embodied a superior and improved type of knockdown universal joint wherein the forces applied to the bearing cups are evenly distributed throughout its periphery by a special form of clamping mechanism and also that there is involved an improved method of forming this special type of clamp, which method involves a relatively few exceedingly simple operations which combine to effect a simple strong and extremely accurately formed clamping member of the type described.

While only one modification of the invention has been disclosed herein it is apparent that modifications and alterations therein may be made within the spirit of the foregoing specification and within the scope of the appended claim.

It is claimed:

In a universal joint, a radially extending trunnion, a bearing cup on the trunnion, a torque transmitting member having an arm terminating in a width greater than the diameter of said cup and being provided at its terminal with a recess adapted to receive said cup, and a U-shaped metal clamp adapted to engage and embrace said cup and the sides of the recessed terminal of said arm, the cup engaging surfaces of said arm and clamp together being coextensive and in contact with the periphery of said cup whereby the cup is engaged entirely around its periphery, and means including interengaging cam surfaces on said arm and clamp adapted to tighten said clamp against said cup and hold the cup in said recess under pressure.

HANS WOLLNER.